United States Patent
Coulter

[11] 3,812,427
[45] May 21, 1974

[54] METHOD AND APPARATUS FOR MONITORING FREQUENCY

[75] Inventor: J. Roland Coulter, Harrison, N.Y.

[73] Assignee: Tull Aviation Corporation, Armonk, N.Y.

[22] Filed: Aug. 17, 1972

[21] Appl. No.: 281,466

[52] U.S. Cl.............................. 324/79 D
[51] Int. Cl........................... G01r 23/14
[58] Field of Search.................. 324/79 D, 78 D

[56] References Cited
UNITED STATES PATENTS
2,851,596  9/1958  Hilton............................ 324/186 X OTHER PUBLICATIONS
Boffi, Electronics, June 1954; pp. 189-191.

Primary Examiner—Alfred E. Smith
Attorney, Agent, or Firm—Curtis Ailes

[57] ABSTRACT

The frequency to be measured and a standard frequency are mixed to obtain a difference frequency and the cycle period of the difference frequency is used as a source of gating signals to gate a plurality of cycles of a standard frequency, the number of gated cycles being counted so that the count provides a measure of the reciprocal of the difference frequency which may be checked within desired limits as an indication of the accuracy of the input frequency.

19 Claims, 1 Drawing Figure

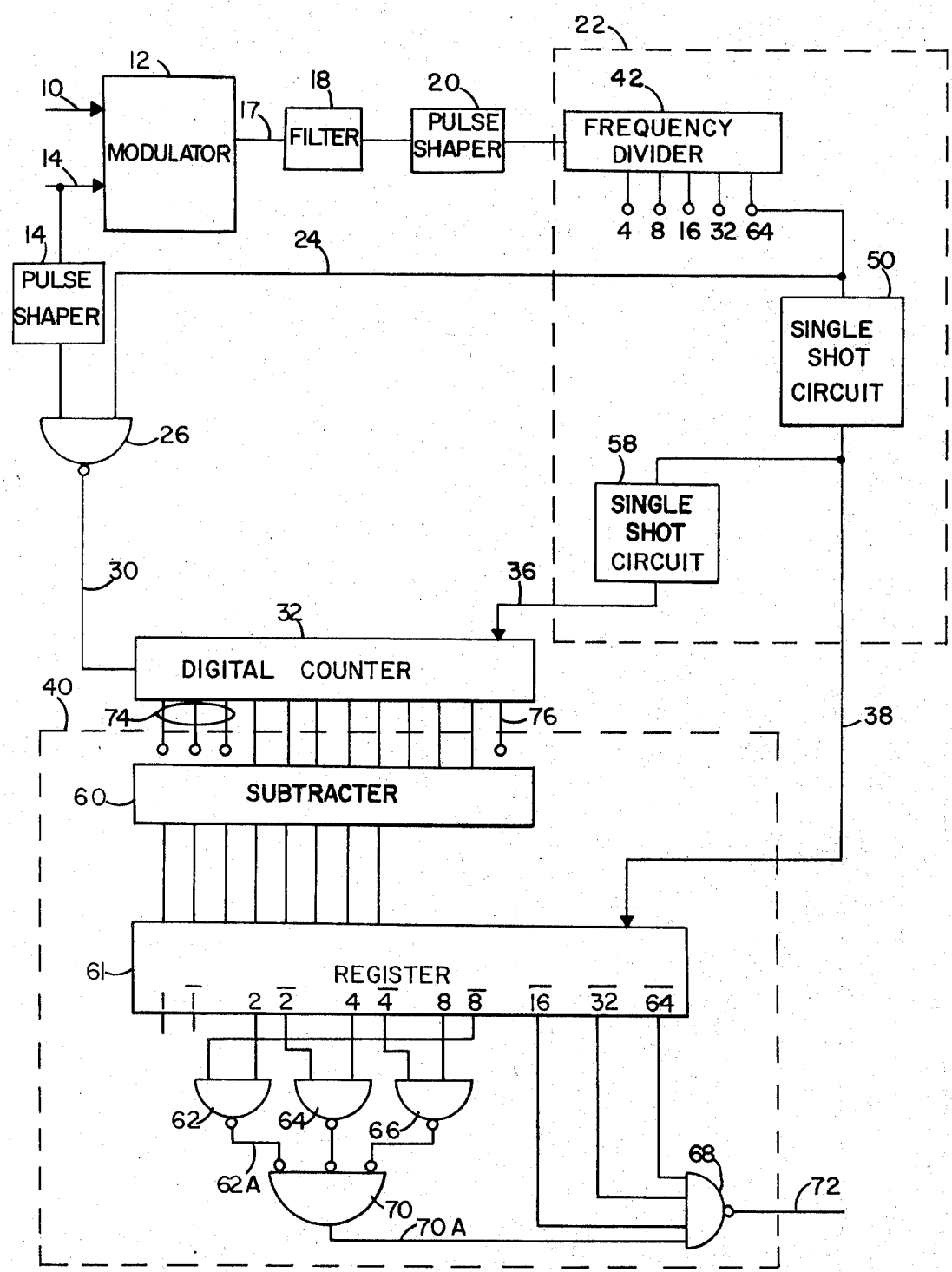

METHOD AND APPARATUS FOR MONITORING FREQUENCY

This invention relates to a method and apparatus for measuring frequency, and for measuring frequency differences, and more particularly for measuring and checking frequencies in the high range of the radio frequency spectrum.

It is often important to measure and control high radio frequencies with great accuracy. One of the important purposes for such measurement is for monitoring the frequency of the carrier waves of radio signals from a transmitter to be sure that the frequency of the carrier remains within a narrow prescribed tolerance level.

Accordingly, it is one object of the present invention to provide an improved method and apparatus for accurately measuring a radio frequency.

Another object of the invention is to provide an improved method and apparatus for accurately measuring the difference between two radio frequencies.

Another object of the invention is to provide an improved frequency measurement method and apparatus which is characterized by a high degree of accuracy and improved economy in construction.

Another object of the invention is to provide an improved frequency measurement system which is operable to check a frequency which is intended to have a fixed nominal value to determine whether or not the frequency is being maintained within predetermined limits, and to provide an output signal whenever the frequency shifts outside the range defined by said predetermined limits.

Other objects and advantages of the invention will be apparent from the following description and the accompanying drawings.

The invention is carried out by a digital method for monitoring the frequency of a frequency source comprising the steps of mixing a frequency signal from the frequency source with a standard frequency to obtain a difference frequency, employing the difference frequency as a source of gating signals to gate a number of cycles of a standard frequency based upon the time period of a predetermined number of cycles of said difference frequency, and counting the number of standard frequency cycles gated by said source of gating signals to determine if the count indicates a cycle period corresponding to the correct frequency from said frequency source.

In the accompanying drawings:

The FIGURE is a schematic circuit diagram illustrating one embodiment of the invention.

Referring more particularly to the FIGURE frequency signals to be checked are supplied at an input line 10 to a balanced modulator 12. A standard frequency from a standard frequency source (not shown) is also supplied to the modulator 12 at a second input connection 14. The modulator 12 mixes the two frequencies and produces, as one of the outputs, a difference frequency at the output connection 17. Since the frequency to be measured at connection 10, and the standard frequency at connection 14 are within known narrow ranges, the difference frequency is also within a known narrow range of frequency value. A filter 18 is provided, which is a low pass filter designed to pass the frequencies only in this narrow difference frequency range. Thus, the output from filter 18 is restricted to the difference frequency. The difference frequency is supplied to a pulse shaper 20 which generates a series of pulses which approach a square wave in shape, and which repeat at the difference frequency period. These square wave pulses from the pulse shaper are suitable for controlling digital circuits.

The square wave pulses from pulse shaper 20 are supplied to a gate control circuit 22. The gate control circuit 22 is preferably digitally operated, including digital components which measure the time interval corresponding to the cycle period for a predetermined number of cycles of the difference frequency, and emit a gating signal on a connection 24 based upon this time period. For instance, typically, the gate control circuit 22 may include a digital frequency divider 42 which divides the difference frequency by a predetermined fixed number. The result is that a gating signal is emitted at connection 24 having a gating time interval corresponding to the cycle periods for the number of cycles determined by the divisor of the frequency divider. These gating signals are supplied to a NAND gate 26.

Standard frequency signals are also supplied from connection 14 through a pulse shaper 28 to the NAND gate 26. Thus, when the NAND gate 26 is enabled by the gating signal on connection 24, a number of pulses corresponding to a number of cycles of the standard frequency are gated through the gate 26 dependent upon the time interval of the gating signal. These pulses are supplied from the output 30 of the gate 26 to a digital counter 32. Thus, the digital count accumulated in the digital counter 32 accurately indicates a reciprocal function of the value of the difference frequency. Thus, the count indirectly, indicates the value of the frequency supplied on input connection 10, expressed as a reciprocal of the difference between that frequency and the standard frequency on input connection 14.

The gate control circuit 22 may be designed so as to provide only one full gating time interval, and then to discontinue operation until it is reset. Thus, the digital counter 32 continues to register the last count until reset occurs. However, in the preferred form of the invention, the digital counter 32 is caused to continuously take new counts, being continually reset after each count by a reset signal on a connection 36 from the gate control circuit 22. A count detector device 40 is provided for the purpose of storing and registering the digital count. The count detector 40 is caused to take the count value from the digital counter 32 and store that count value by timing signals supplied from the gate control circuit 22 through a connection 38. The count detector 40 may include a visual count indicator, or means for additionally recording numbers indicating the count. The recording means may consist of a magnetic tape-recorder, a punched paper tape-recorder, or other digital storage means. The count detector 40 may also include means for detecting and indicating if the count number falls outside of the limits of a predetermined range of acceptable deviation of the count.

The gate control circuit 22 includes a digital frequency divider 42. The frequency divider 42 may simply consist of a digital counter, and it is shown as including output terminals corresponding to counts respectively having the values 4, 8, 16, 32, and 64. The 64 output terminal (signifying division by a factor of 64) is connected to supply the output at connection 24 to gate 26. If desired, other division factors may be selected by connecting the connection 24 to outputs other than the output 64 of the frequency divider 42. For instance, connection 24 may be connected to the output terminal 32 or the output terminal 16, signifying reductions in the overall division factor.

By dividing the difference frequency in divider 42, a gating interval is provided on connection 24 corresponding to the period of a number of cycles of the difference frequency. This provides a longer gating interval permitting a larger number of pulses to be gated through the gate 26 and to be counted by the digital counter 32. Thus, a higher accuracy is provided in determining the difference frequency.

A single shot circuit 50 is connected to receive these gating signals on connection 24, and is effective to detect the end of each gating pulse, and to then emit a pulse on connection 38. This causes the storage of a number in the count detector 40 indicative of the count accumulated in the digital counter 32. A second single shot circuit 58 is connected to the output of circuit 50, and is operable only at the end of the output pulse from circuit 50 to provide a reset pulse on connection 36 to the digital counter 32. Thus, at the end of each gating pulse, the count result is first stored in count detector 40A, and then the counter 32 is reset so as to be ready for the next counting operation.

The single shot circuits 50 and 58 may be simple monostable flip-flop circuits which change state in response to an input signal, and then automatically reset after a predetermined period of time, providing an output pulse for the interval during which they are set.

A preferred embodiment of the count detector 40 includes a subtractor 60, a storage register 61, and a network of logic gates connected to determine whether or not the number stored in the register 61 is within predetermined limits. This network of logic gates includes NAND gates 62, 64, 66, and 68, and a NOR gate 70. A signal on the output connection 72 from the NAND gate 68 indicates an "alarm" condition in which the frequency difference is out-of-limits.

In the application of the invention for which this preferred embodiment is designed, the frequencies at the input connections 10 and 14 are expected to vary within narrow limits. Accordingly, the number indicating the difference in frequencies as detected by the digital counter 32 is expected to be within predictable limits. In accordance with this preferred embodiment, the circuitry for detecting whether or not the count is within the desired limits is simplified by discarding, or not using, high order count values indicative of variations in the count value which are beyond the range of variations which would normally be encountered. This discarding of high order counts is signified by the output connection 76 from counter 32 which is not connected to subtractor 60. The dropping of high order digits from the counts recorded by the digital counter 32 is equivalent to subtraction of quantities from the count which are recorded by the high order digits. The checking function is also simplified by discarding or ignoring low order digits of the count from the digital counter 32, as signified for instance by the output lines 74, on the basis that these count values represent insignificant variations in the count.

The detection of the count is further simplified by actually subtracting a quantity in the subtractor 60 from the count recorded in the digital counter 32 to derive a relatively small number in which variations over a desired range can be detected by relatively simple gating circuits. In the embodiment shown, the gating circuits 62-70 are connected to the register 61 to detect an acceptable range of variation in the numbers stored in the register 61 from two to 13. Thus, the first values outside of these limits, values which cause the out-of-limits alarm signal, are one and 14 respectively.

The output lines of the register 61 are labeled with the values which they signify. Thus, the terminal labeled "2" indicates the existence of the storage of a count of two. The terminal labeled "$\overline{2}$" indicates the absence of a count of two stored in the two order digit position. A similar notation is used for the four, eight, 16, 32, and 64 order digits. The one order digit information is ignored by the gates 62, 64, and 66. The NAND gate 62 operates in response to the existence of a two digit and the absence of an eight digit (the $\overline{8}$ signal) to provide a logic zero output signal at the output connection 62A to the NOR gate 70. If the NOR gate 70 receives a logic zero signal from any one of the gates 62, 64, or 66, it provides a logic one output on connection 80A to the NAND gate 68. If all of the inputs to NAND gate 68 are logic ones, then the output at 72 is logic zero and no alarm is given to indicate an out-of-limits condition. This condition is met, for instance, if the actual number stored in the register has the value two. Thus, for such a value, in addition to the logic one output at 70A, there are logic one outputs on the $\overline{16}$, $\overline{32}$, and $\overline{64}$ connections indicating the absence of counts at those digital orders.

Since the "two" digit is required in conjunction with the absence of the "eight" digit in the counts of three, six and seven, in addition to the count of two, the gate 62 detects the presence of all of those counts. Similarly, the gate 64 detects the presence of counts four, five, 12, and 13, and the gate 66 detects the presence of counts eight, nine, 10 and eleven. As previously stated, any counts outside of the range two through thirteen cause the emission of an out-of-limits signal at connection 72.

The $\overline{16}$, $\overline{32}$, and $\overline{64}$ outputs from the register 61, as detected at the NAND gate 68, permit positive identification of count values which are substantially out of range on the high side. Thus counts out of range on the high side will cause one or more of these signals to disappear. Similarly, any resultant count value stored in register 62 which is substantially out of the desired range on the low side will cause storage of the resultant number in complemented form, again causing the outputs on one or more of the output connections $\overline{16}$, $\overline{32}$, and $\overline{64}$ to disappear, to thus detect an alarm condition.

While not illustrated in detail, it is apparent that with minor changes in the output gates 62-70, it is possible to obtain output signals indicating whether the frequency difference is too high or too low. It is obvious that it is possible then to use these "too high" or "too low" signals as control signals to adjust the frequency of the output of the radio frequency source which is being monitored at the input connection 10 to thus maintain that frequency within desired limits.

Because of the small numbers which are to be dealt with in the final checking operations of this system, the operation of subtraction by the subtracotr 60 is preferably carried out by complement arithmetic. Thus, the subtractor 60 is actually a digital adder which adds the complement of a fixed number to the count value in the digital counter 32. By adding the complement of a slightly larger number than the number expected in the digital counter 32, the difference is stored in complement form in the register 62. Recomplementation is accomplished simply by detecting the stored value by inverse connections of the gates 62, 64, 66, and 68 to the output terminals of the register 62. To avoid confusion, this recomplementing is not shown by the labeling of the output terminals of the register 62. These terminals are labeled rather in terms of the actual recomplemented values which the outputs signify.

In an actual physical embodiment, the nominal value of the number expected to be stored in the digital counter 32 is 48. The subtractor 60 is operable to add the complement value of the number 56. The nominal difference value of eight is then stored in complement form in the register 61.

The following data provides a specific mathemetical example of the operation of the system. The specific figures given in this example are not intended to limit the scope of the invention, but are intended to illustrate the utility of the invention.

Assuming a standard frequency at connection 14 as follows: 5,213,750 Hz.

and using a carrier frequency on connection 10 as follows: 5,209,270 Hz, the difference frequency appearing at the output of the pulse shaper 20 is as follows: 4,480 Hz.

The frequency divider 42, with the connection shown, provides a frequency division factor of 64. Accordingly, the output frequency gating signal to gate 26 on gating connection 24 is 4480/64 Hz (cycles per second). The total time period for this number of cycles is therefore the inverse of this quantity or 64/4480 (seconds per cycle). However, the gating interval during which the gating signal at connection 24 is on lasts for only one-half cycle so therefore the gating interval is one-half of the above value or 32/4480 seconds.

the number of standard frequency pulses which are gated through the gate 26 during this time interval are then equal to 32/4480 multiplied by 5,213,750. This yields an expected numerical value of 37,200.

By discarding the three lowest order digits from the counter 32, corresponding to values 1, 2 and 4, there is accomplished an effective division of the last-mentioned number by a factor of eight, yielding a resultant number of 4,656.

By dropping the binary digits corresponding to the numerical values 4,096 and 512, which would be expected to be stored in the digital counter as a part of the above number, those values are effectively subtracted from the number 4,656, yielding a net number of 48.

The net number 48 is then combined in the subtractor with the complement of the number 56, as previously described above, to store in register 61 the difference number having a nominal value of 8.

Because the nominal number registered in the counter 32 (after dropping the three lowest order digits) of 4,656 is of the same order of magnitude as the difference frequency given above of 4,480 Hz., variations in the final nominal number of eight represent a direct indication of variations in the difference frequency in approximately 1 Hz increments. Accordingly, maintaining the final number in the range from two through 13 is equivalent to maintenance of the carrier frequency within a range of plus or minus 6 Hz. This is within an approximate accuracy of one part in a million. This is believed to be a remarkable result when considering how simple the apparatus is.

The invention has been described above in terms of checking a frequency signal on the input connection 10 of the drawing against a standard frequency connected to connection 14 by determining the frequency difference between the two. However, it should be pointed out that the so-called standard frequency could be connected to the input connection 10, and the frequency to be monitored could be connected to connection 14. The circuit could be operated successfully with this change in connections. Furthermore, in certain applications, the difference between the two frequencies may be more important than the absolute value of either of the frequencies. Accordingly, for such a situation, the present invention is particularly useful because it directly measures and monitors the difference between the two frequencies. Thus, even if both of the frequency inputs vary, the difference is carefully monitored.

While this invention has been shown and described in connection with a particular preferred embodiment, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method for checking the difference between the frequencies from two different frequency sources comprising the steps of
    mixing the frequency signals from said different frequency sources to obtain a difference frequency,
    employing the difference frequency as a source of gating signals to gate a number of cycles of the frequency from one of said frequency sources based upon the time period of a predetermined number of cycles of said difference frequency,
    counting the number of cycles gated by said source of gating signals,
    and numerically checking the count to determine whether it is within predetermined numerical limits indicating a desired range of variation in the difference between said two different frequencies.

2. A method as claimed in claim 1 including the additional step of
    discarding the highest order digits in the count of the number of cycles gated by said source of gating signals to simplify the checking of the count to see that it is within desired limits.

3. A method as claimed in claim 1 including the step of
    discarding low order digits in the count of the number of cycles gated by said source of gating signals in order to simplify the checking of the count to see if it is within limits,
    the discarded low order digits corresponding to count values which are insignificant in checking the difference frequency within the required accuracy.

4. A method as claimed in claim 1 including the additional step of subtracting a predetermined fixed number from the count of the number of cycles gated by said source of gating signals to derive a difference count number in the order of magnitude of a number representing the maximum desired range of variations of the difference between the frequencies of said two different frequency sources.

5. Apparatus for monitoring the frequency value of a high frequency signal comprising a modulator arranged to receive the signal to be monitored, said modulator being arranged to receive a standard frequency to be compared with the frequency to be monitored, means for deriving from said modulator a difference frequency corresponding to the difference between the frequency to be monitored and said standard frequency, a gate control means operable to receive the difference frequency signals and operable to generate gating signals each having time periods of duration based upon the time period of a predetermined number of cycles of said difference frequency, a logic gate device connected to be enabled by said gating signals, said gating device being connected to receive frequency signals from a standard frequency source, a digital counter connected to receive the standard frequency signals gated through said gating device and to register a count of the number of cycles of said standard frequency gated through said gating device, and count detector means connected to said counter and including digital logic circuitry operable to determine whether or not the registered count is within predetermined limits corresponding to a desired range of values for the monitored frequency.

6. Apparatus for monitoring the difference between the frequencies from two different frequency sources comprising a modulator arranged to receive the frequencies from said two different frequency sources and operable to derive a frequency corresponding to the difference between the frequencies from said two different sources, a gate control circuit connected to receive the difference frequency and operable to issue periodic gating signals each having a time period based upon the time period of a predetermined number of cycles of the difference frequency, a gating device connected to receive said gating signals, said gating device being arranged to receive signals of a known frequency to be gated through said gating device by said gating signals, a digital counter connected to the output of said gating device and operable to count the number of cycles of the known frequency gated through said gating device during a gating time period, and count detector means connected to said counter and including digital logic circuitry operable to determine whether or not the registered count is within predetermined limits corresponding to a desired range of values for the difference frequency.

7. Apparatus as claimed in claim 6 wherein
said gating device is connected to receive one of the frequencies from said two different frequency sources to serve as the known frequency gated through to said digital counter.

8. Apparatus as claimed in claim 7 wherein
a pulse shaper is connected to the input of said gate device which is arranged to receive said known frequency so as to provide substantially square wave pulses at said known frequency to said gating device.

9. Apparatus as claimed in claim 6 wherein
said gate control circuit includes a frequency divider operable to divide said difference frequency to provide gating signals based on the division and having a period equivalent to a plurality of cycle periods of said difference frequency.

10. Apparatus as claimed in claim 6 wherein
said digital counter includes a reset means for resetting said counter when a new count is to be taken.

11. Apparatus as claimed in claim 6 including
a circuit connection from said gate control circuit to said count detector for enabling said count detector with a store signal to read and transfer the count value within said digital counter to said count detector.

12. Apparatus as claimed in claim 11 wherein
said counter includes a reset means for resetting said counter when a new count is to be taken,
said gate control circuit including means connected to supply a counter reset signal to said counter reset means after the emission of a store signal to said count detector.

13. Apparatus as claimed in claim 11 wherein
the connections from said digital counter to said count detector are limited to predetermined low order digit signal connections to thereby discard high order digit portions of the count value within the digital counter having known count values.

14. Apparatus as claimed in claim 11 wherein
said count detector includes means for subtracting a fixed number from the count stored in said digital counter in order to reduce the size of the net number to a small digital value for greater ease in determining the correctness thereof.

15. Apparatus as claimed in claim 14 wherein
said count detector includes a register connected to receive the net number from said subtractor and to store that number for further reference.

16. Apparatus as claimed in claim 15 wherein said digital logic circuitry comprises logic gates connected to output connections from said register for detecting whether or not the net count value stored in said register is within desired limits for emitting a signal indicative thereof.

17. Apparatus as claimed in claim 6 wherein
said modulator comprises a balanced modulator for deriving said difference frequency.

18. Apparatus as claimed in claim 17 wherein
a filter is provided between said modulator and said gate control circuit,
said filter being a low pass filter for passing only the difference frequency.

19. Apparatus as claimed in claim 18 wherein
a pulse shaper is connected in circuit between said filter and said gate control circuit for providing a substantially square wave to said gate control circuit at said difference frequency.

* * * * *

PO-1050
(5/69)

UNITED STATES PATENT OFFICE
CERTIFICATE OF CORRECTION

Patent No. 3,812,427    Dated May 21, 1974

Inventor(s) J. ROLAND COULTER

It is certified that error appears in the above-identified patent and that said Letters Patent are hereby corrected as shown below:

Abstract, line 1, "measured" should read --monitored--.
Column 4, line 11, "2" should read "2";
         line 12, "_" should read --2--;
         line 23, "80A" should read --70A--;
         line 65, "subtracotr" should read --subtractor--.
Column 7, line 7, "variations" should read --variation--.
Column 8, line 54, after "limits" insert --and--.

Signed and sealed this 19th day of November 1974.

(SEAL)
Attest:

McCOY M. GIBSON JR.    C. MARSHALL DANN
Attesting Officer    Commissioner of Patents